United States Patent
Riefe et al.

(10) Patent No.: US 7,347,451 B2
(45) Date of Patent: Mar. 25, 2008

(54) PRE-CRASH COLUMN RELEASE

(75) Inventors: Richard K Riefe, Saginaw, MI (US); Minoo J. Shah, Farmington Hills, MI (US); Ray G. Armstrong, Bay City, MI (US); Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 305 days.

(21) Appl. No.: 11/013,585

(22) Filed: Dec. 16, 2004

(65) Prior Publication Data
US 2006/0131863 A1  Jun. 22, 2006

(51) Int. Cl.
*B62D 1/11* (2006.01)
(52) U.S. Cl. ..................... 280/777; 280/775
(58) Field of Classification Search ............. 280/777, 280/775; 70/182–186, 252
See application file for complete search history.

(56) References Cited

U.S. PATENT DOCUMENTS

| | | | |
|---|---|---|---|
| 4,130,298 A * | 12/1978 | Shaunnessey | 280/730.1 |
| 5,507,521 A * | 4/1996 | Steffens, Jr. | 280/775 |
| 5,626,364 A | 5/1997 | Nakamura | |
| 5,871,233 A | 2/1999 | Tanaka et al. | |
| 6,227,571 B1 * | 5/2001 | Sheng et al. | 280/777 |
| 6,244,128 B1 | 6/2001 | Spencer et al. | |
| 6,959,944 B2 * | 11/2005 | Mori et al. | 280/728.2 |
| 7,048,306 B2 * | 5/2006 | Riefe | 280/777 |
| 2002/0024210 A1 * | 2/2002 | Nomura et al. | 280/777 |
| 2004/0150207 A1 * | 8/2004 | Satou | 280/777 |

FOREIGN PATENT DOCUMENTS

WO    WO200037298 A  *  6/2000

* cited by examiner

*Primary Examiner*—Ruth Ilan
*Assistant Examiner*—Leonard McCreary, Jr.
(74) *Attorney, Agent, or Firm*—Michael D. Smith

(57) ABSTRACT

A steering column assembly (10) for a vehicle includes first and second members (12, 14) engaged for movement relative to one another along one of a tilting path (16) and a telescoping path. The steering column assembly (10) also includes an electric lock (18) operable to lock the first and second members (12, 14) into a locked configuration that restricts movement and an unlocked configuration that permits movement between the members. The steering column assembly (10) also includes a sensor (20) operable to sense a vehicle crash condition and then emit a crash signal to a controller (22) that controls the electric lock (18) to change from the locked configuration to the unlocked configuration in response to the signal.

11 Claims, 2 Drawing Sheets

PRE-CRASH COLUMN RELEASE

FIELD OF THE INVENTION

The invention relates to a steering column of a vehicle and more particularly to lock for locking the steering column after adjusting movement.

BACKGROUND OF THE INVENTION

Some drivers tend to tilt the column to a fully, upwardly tilted position when driving. When the column is tilted all the way up in a vehicle crash, the column can be subjected to an overturning moment resulting in column binding which prevents and/or limits energy-absorbing collapse. Other drivers sit extremely close to the steering wheel. When the driver is positioned extremely close to the steering wheel in a vehicle crash, deployment of the air bag can seriously injure the driver.

SUMMARY OF THE INVENTION AND ADVANTAGES

The invention provides a steering column assembly for a vehicle. The steering column assembly includes first and second steering column members engaged for movement relative to one another along one of a tilting path and a telescoping path. The steering column assembly also includes an electric lock operable in a locked configuration and an unlocked configuration to selectively lock the first and second steering column members. When the electric lock is in the locked configuration, the first and second steering column members are locked with respect to one another. When the electric lock is in the unlocked configuration, the first and second steering column members are moveable with respect to one another. The steering column assembly also includes a sensor operable to sense a condition corresponding to a vehicle crash. The sensor emits a signal corresponding to the condition. The steering column assembly also includes a controller operable to receive the signal from the sensor and controls the electric lock to change from the locked configuration to the unlocked configuration in response to the signal.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
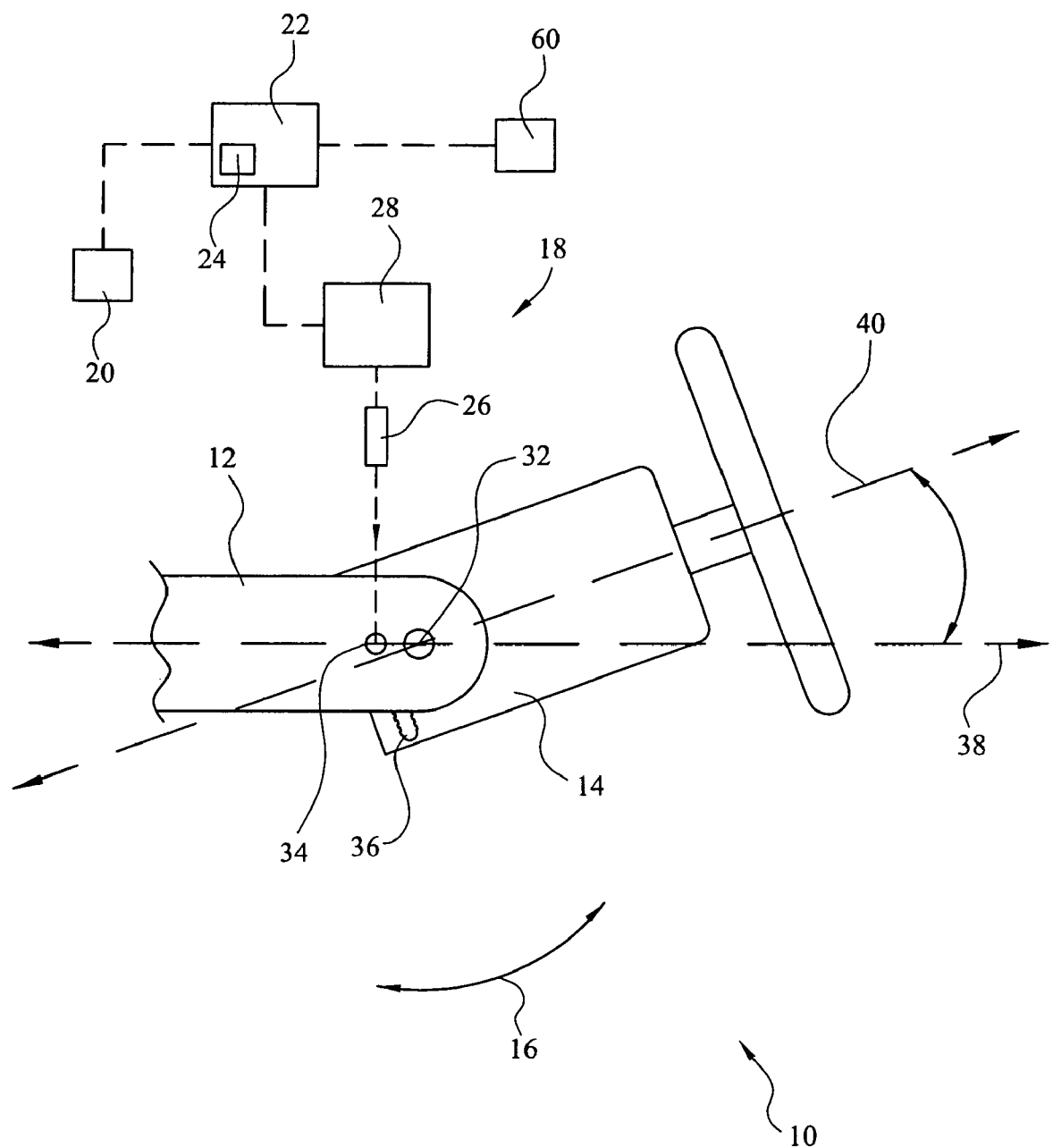
FIG. 1 is schematic view of a steering column assembly according to the exemplary embodiment of the invention.

The invention provides a steering column assembly 10 for a vehicle. The steering column assembly 10 includes first and second steering column members 12, 14 engaged for movement relative to one another along one of a tilting path 16 and a telescoping path. The steering column assembly 10 also includes an electric lock 18 operable in a locked configuration and an unlocked configuration to selectively lock the first and second steering column members 12, 14. When the electric lock 10 is in the locked configuration, the first and second steering column members 12, 14 are locked with respect to one another. When the electric lock 10 is in the unlocked configuration, the first and second steering column members 12, 14 are moveable with respect to one another. The steering column assembly 10 also includes a sensor 20 operable to sense a condition corresponding to a vehicle crash. The sensor 20 emits a signal corresponding to the condition. The steering column assembly 10 also includes a controller 22 operable to receive the signal from the sensor 20 and controls the electric lock 18 to change from the locked configuration to the unlocked configuration in response to the signal.

In the exemplary embodiment of the invention shown in the figures, the second steering column member 14 tilts relative to the first steering column member 12 about a tilting axis 32. The first steering column member 12 defines an axis 38 and the second steering column member 14 defines and axis 40. In alternative embodiments of the invention, the first and second steering column members 12, 14 could telescope relative to one another. Also, in the exemplary embodiment of the invention shown in the figures, the electric lock 18 is a positive lock and includes a pin-like locking portion 26. In alternative embodiments of the invention, the electric lock 18 could be a compressive lock, or friction lock, and the locking portion 26 could be a rotatable, threaded shaft.

The electric lock 18 includes the locking portion 26 movable between a locked position and an unlocked position and an actuator 28 operable to move the locking portion 26 between both of the locked and unlocked positions. When in the locked position, the locking portion 26 of the exemplary embodiment is inserted in an aperture 34 defined by the first steering column member 12 and in a tooth-lined slot 36 defined by the second steering column member 14. When in the unlocked position, the locking portion 26 of the exemplary embodiment is spaced from the aperture 34 and the tooth-lined slot 36, as shown in FIG. 1. The locking portion 26 is moveable only by the actuator 28. The electric lock 18 is also controlled by a switch 60 position within reach of the driver. The switch 60 can communicate with the electric lock 18 through the controller 22 or in parallel to the controller 22.

The invention advantageously uses the electric lock 18 used during normal vehicle handling to enhance safety during a vehicle crash and does not require an additional and/or specialized and/or dedicated actuator to unlock the first and second steering column members 12, 14 in a crash. As result, the invention provides a reduction in parts, cost and complexity over the prior art. Another currently appreciated advantage provided the invention is reduced servicing of the electric lock 18 after a crash or near-crash. For example, a specialized unlocking device that is dedicated to unlocking the column in a crash must be replaced or reset after being engaged. If a vehicle is involved in a near-crash and not a crash, the specialized unlocking device may engage anyway, requiring immediate service before the vehicle is safe to drive. Alternatively, the controller of the specialized unlocking device must be programmed to raise the conditions required to engage to reduce false engagements, comprising the safety benefits the device. The present invention eliminates this compromise by being re-engageable substantially immediately after the crash or near-crash.

The steering column assembly 10 of the exemplary embodiment includes a timer 24 to re-engage the electric lock 18. The timer 24 is operable to start timing a predetermined period of time when the signal is emitted by the sensor 20. After the predetermined period of time, the timer 24 emits a second signal to the controller 22. The controller 22 is operable to receive the second signal and control the electric lock 18 to change from the unlocked configuration to the locked configuration in response to the second signal. The timer 24 can be integral with the controller 22 or separate from the controller 22.

The sensor 20 of the exemplary embodiment can be operable to sense a second condition corresponding to normal vehicle handling and to emit a third signal corresponding to the second condition. In other words, the sensor 20 and controller 22 can communicate such that, during normal vehicle handling, the sensor 20 emits the third signal corresponding to non-crash conditions. When a crash or near-crash occurs, the sensor 20 can cease emitting the third signal and emit the signal corresponding to crash or near-crash conditions. Such a sensor 20 could be used in conjunction with, or in placed of, the timer 24. The sensor 20 can be any type of crash related sensor including an air bag deployment sensor, a speed sensor, an acceleration sensor, and/or a lateral acceleration sensor.

Figure 2:
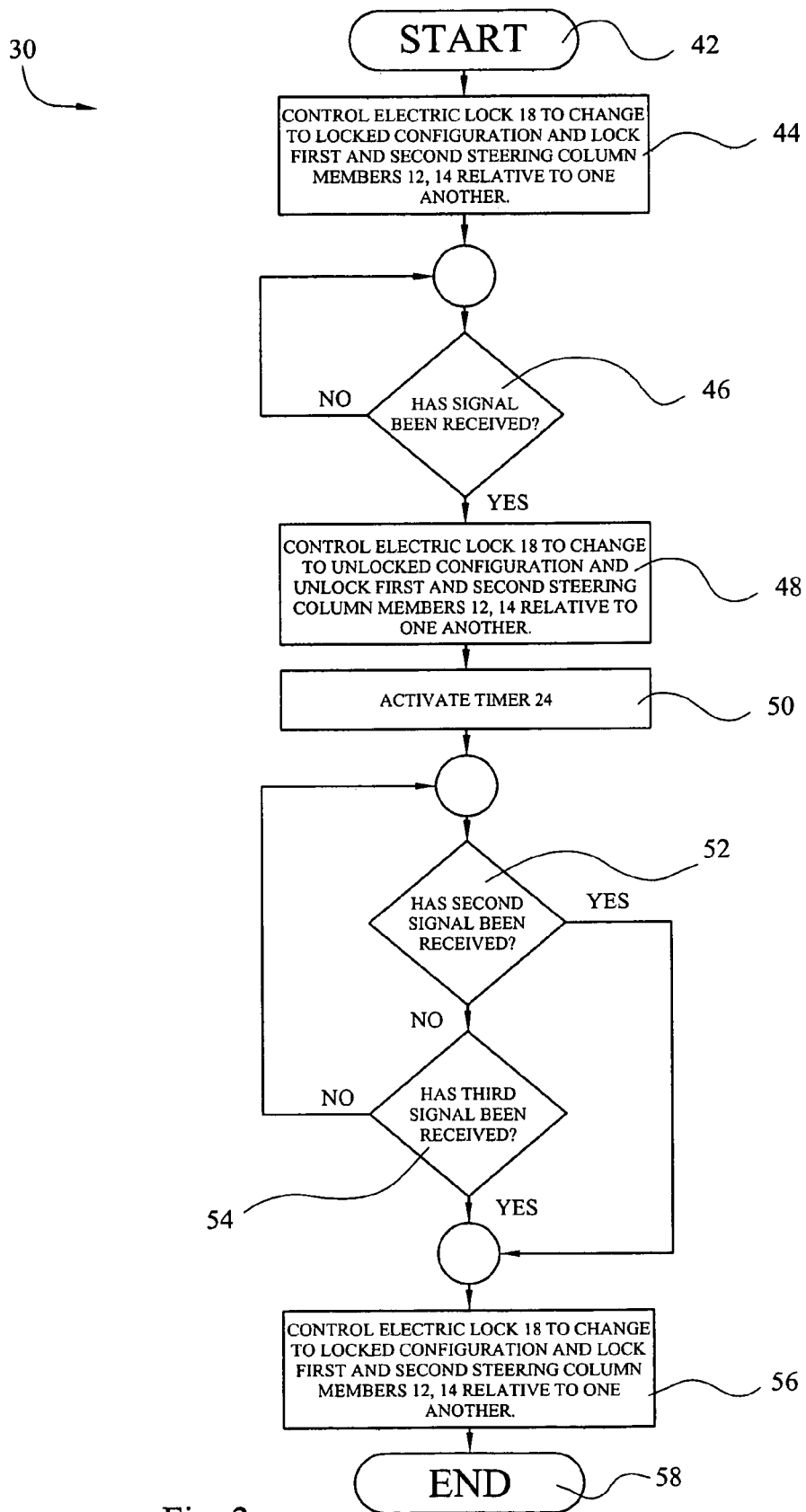
FIG. 2 is a simplified flow diagram illustrating the steps performed by a controller according to the exemplary embodiment of the invention.

FIG. 2 illustrates a simplified flow diagram of the a method or process 30 for practicing the exemplary embodiment of the invention. The process 30 starts at step 42. At step 44, the controller 22 controls the electric lock 18 to engage the actuator 28 to move the locking portion 26 to the locked position to lock the first and second steering column members 12, 14 with respect to one another. At step 46, the controller 22 determines if the signal has been received from the sensor 20, indicating a crash or near-crash. If the signal has not been received, the controller 22 will continue to monitor for the signal. If the signal has been received, the process 30 continues to step 48 and the controller 22 controls the electric lock 18 to engage the actuator 28 to move the locking portion 26 to the unlocked position to unlock the first and second steering column members 12, 14 with respect to one another. When the locking portion 26 moves to the unlocked position, the second steering column member 14 should move downward and the axis 38, 40 should align. At step 50, the timer 24 is activated. At step 52, the controller 22 determines if the second signal has been received, indicating that the predetermined period of time has passed. The predetermined period can be seconds or minutes. The predetermined period of times can be determined based on the crash or near-crash conditions sensed by the sensor 20. In other words, if the signal indicates severe crash conditions, the predetermined period can be longer than if the signal indicates relatively minor crash conditions. If the predetermined period has not passed, the process 30 continues to step 54. If the predetermined period has passed, the process 30 bypasses step 54. At step 54, the controller 22 determines if the third signal has been received, indicating that crash or near-crash conditions or no longer sensed by the sensor 20. For example, if the vehicle is no longer moving and/or is not experience longitudinal or transverse forces or moments, the sensor 20 can emit the third signal. If the third signal has not been received, the process 30 returns to step 52. If the third signal has been received, the process 30 continues to step 56. At step 56, the controller 22 controls the electric lock 18 to engage the actuator 28 to move the locking portion 26 to the locked position to lock the first and second steering column members 12, 14 with respect to one another. The process 30 ends at step 58.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly (10) for a vehicle comprising:

first and second steering column members (12, 14) engaged for movement relative to one another along one of a tilting path (16) and a telescoping path;

an electric lock (18) operable in a locked configuration wherein said first and second steering column members (12, 14) are locked with respect to one another and an unlocked configuration wherein said first and second steering column members (12, 14) are moveable with respect to one another to selectively lock said first and second steering column members (12, 14);

a sensor (20) operable to sense a crash condition corresponding to a vehicle crash and to emit a crash signal corresponding to the crash condition; and a controller (22) operable to receive said crash signal and to control said electric lock (18) to change from said locked configuration to said unlocked configuration in response to said crash signal; and said electric lock (18) having a locking portion (26) movable between a locked configuration and an unlocked configuration, an actuator (28) supported by said first steering column member (12) and operable to move said locking portion (26) between both of said locked and unlocked configurations, and an aperture (34) in said second steering column member (14) for receipt of said locking portion (26) when in said locked configuration.

2. The steering column assembly (10) of claim 1 further comprising:

a timer (24) operable to start timing a predetermined period of time when said crash signal is emitted by said sensor (20) and emit an expiration signal at an expiration of said predetermined period of time.

3. The steering column assembly (10) of claim 2 wherein said controller (22) is operable to receive said expiration signal and control said electric lock (18) to change from said unlocked configuration to said locked configuration in response to said expiration signal.

4. The steering column assembly (10) of claim 1 wherein said sensor (20) is operable to sense a normal condition corresponding to normal vehicle handling and to emit a normal signal corresponding to said normal condition.

5. The steering column assembly (10) of claim 4 wherein said controller (22) is operable to receive said normal signal and control said electric lock (18) to change from said unlocked configuration to said locked configuration in response to said normal signal.

6. The steering column assembly (10) of claim 1 wherein in said locking portion (26) is further defined being moveable only by said actuator (28).

7. A method (30) for controlling a steering column assembly (10) for a vehicle comprising the steps of:

engaging first and second steering column members (12, 14) for movement relative to one another along one of a tilting path (16) and a telescoping path;

selectively locking the first and second steering column members (12, 14) with an electric lock (18) operable in a locked configuration wherein the first and second steering column members (12, 14) are locked with respect to one another and an unlocked configuration wherein the first and second steering column members (12, 14) are moveable with respect to one another;

sensing a condition corresponding to a vehicle crash and emitting a signal corresponding to the condition with a sensor (20);

receiving the signal and controlling the electric lock (18) to change from the locked configuration to the unlocked configuration in response to the signal with a controller (22); and wherein the step of said selectively locking the steering column members includes the step of moving a locking portion (26) of the electric lock (18) with a actuator (28) of the electric lock (18) between the locked and unlocked configurations.

8. The method (30) of claim 7 wherein said moving step is further defined as moving the locking portion (26) only with the actuator (28).

9. The method (30) of claim 7 wherein said moving step is further defined as moving the locking portion (26) during normal vehicle handling and during the vehicle crash with the actuator (28).

10. The method (30) of claim 7 further comprising the step of:

controlling the electric lock (18) to move the locking portion (26) with the actuator (28) to the locked configuration after the vehicle crash.

11. A steering column assembly (10) for a vehicle comprising:

first and second steering column members (12, 14) engaged adjustably to one another for movement along a path;

an electric lock constructed and arranged to attach directly between said first and second steering column members (12, 14) when in a normally locked configuration that restricts movement along said path, and disengage from at least one of said first and second steering column members (12, 14) when in an unlocked configuration that enables movement along said path;

a sensor (20) constructed and arranged to sense an imminent crash condition and to emit a corresponding crash signal; and a controller (22) constructed and arranged to electrically receive said crash signal and to control said electric lock (18) to change from said normally locked configuration to said unlocked configuration in response to said crash signal; and said electric lock (18) having a locking portion (26) movable between said locked and unlocked configurations, an actuator (28) supported by said first steering column member (12) and operable to move said locking portion (26) between both of said locked and unlocked configurations, and an aperture (34) in said second steering column member (14) for receipt of said locking portion (26) when in said locked configuration.

* * * * *